US012656929B2

(12) United States Patent
Ivanov et al.

(10) Patent No.: US 12,656,929 B2
(45) Date of Patent: Jun. 16, 2026

(54) TECHNIQUES FOR GENERATING IMMERSIVE SPACES THAT ENABLE INSPIRATIONAL MATERIALS TO BE COLLECTED, DISCOVERED, AND ENVISIONED

(71) Applicant: AUTODESK, INC., San Francisco, CA (US)

(72) Inventors: Alexander Arden Ivanov, Calgary (CA); Fraser Anderson, Toronto (CA); Tovi Grossman, Toronto (CA); David Ledo Maira, Toronto (CA); George Fitzmaurice, Toronto (CA)

(73) Assignee: AUTODESK, INC., San Francisco, CA (US)

( * ) Notice: Subject to any disclaimer, the term of this patent is extended or adjusted under 35 U.S.C. 154(b) by 158 days.

(21) Appl. No.: 18/181,431

(22) Filed: Mar. 9, 2023

(65) Prior Publication Data

US 2023/0393701 A1    Dec. 7, 2023

Related U.S. Application Data

(60) Provisional application No. 63/348,758, filed on Jun. 3, 2022.

(51) Int. Cl.
G06F 3/04815        (2022.01)
G06F 3/04845        (2022.01)
(Continued)

(52) U.S. Cl.
CPC ...... G06F 3/04815 (2013.01); G06F 3/04845 (2013.01); G06F 3/0486 (2013.01);
(Continued)

(58) Field of Classification Search
CPC ............ G06F 3/04815; G06F 3/04845; G06F 3/0486; G06F 3/0488; G06F 3/0482;
(Continued)

(56) References Cited

U.S. PATENT DOCUMENTS

| | | | |
|---|---|---|---|
| 10,417,356 B1 * | 9/2019 | Arterburn | ............... G06F 30/20 |
| 2008/0028341 A1 * | 1/2008 | Szeliski | .............. G06F 3/04815 |
| | | | 715/205 |

(Continued)

OTHER PUBLICATIONS

Agarawala et al., "Keepin' It Real: Pushing the Desktop Metaphor with Physics, Piles and the Pen", CHI 2006 Proceedings, https://doi.org/10.1145/1124772.1124965, Apr. 22-27, 2006, pp. 1283-1292.

(Continued)

*Primary Examiner* — Daniel F Hajnik
*Assistant Examiner* — Chris Alejandro Puntier
(74) *Attorney, Agent, or Firm* — Artegis Law Group, LLP

(57)        ABSTRACT
A computer-implemented method for generating a virtual collection of digital materials includes: generating a virtual three-dimensional (3D) design workspace; and, in response to a first operation that is associated with a first media file: automatically generating a virtual 3D representation of the first media file; and automatically incorporating the virtual 3D representation of the first media file into the virtual 3D design workspace.

18 Claims, 10 Drawing Sheets

(51) Int. Cl.

| | |
|---|---|
| *G06F 3/0486* | (2013.01) |
| *G06T 7/40* | (2017.01) |
| *G06T 7/90* | (2017.01) |
| *G06T 19/20* | (2011.01) |

(52) U.S. Cl.
CPC ................. *G06T 7/40* (2013.01); *G06T 7/90* (2017.01); *G06T 19/20* (2013.01); *G06T 2200/24* (2013.01); *G06T 2219/2012* (2013.01); *G06T 2219/2016* (2013.01)

(58) Field of Classification Search
CPC .. G06T 7/40; G06T 7/90; G06T 19/20; G06T 2200/24; G06T 2219/2012; G06T 2219/2016; G06T 19/00
See application file for complete search history.

(56) References Cited

U.S. PATENT DOCUMENTS

| | | | | |
|---|---|---|---|---|
| 2010/0198563 | A1* | 8/2010 | Plewe ................... | G06F 30/392 703/1 |
| 2012/0173991 | A1* | 7/2012 | Roberts ............... | G06F 3/04815 715/747 |
| 2013/0144566 | A1* | 6/2013 | De Biswas ............. | G06F 30/00 703/1 |
| 2015/0356774 | A1* | 12/2015 | Gal ........................ | G06F 30/00 345/633 |
| 2017/0249129 | A1* | 8/2017 | McDaniel .......... | G05B 19/0426 |
| 2018/0197223 | A1* | 7/2018 | Grossman ............. | G06F 3/0482 |
| 2020/0302693 | A1* | 9/2020 | Singh ................. | G06Q 30/0643 |
| 2022/0005260 | A1* | 1/2022 | Joris ........................ | G06T 19/20 |
| 2022/0091722 | A1* | 3/2022 | Faulkner ............... | G06F 3/0485 |

OTHER PUBLICATIONS

Benjamin et al., "Juxtapoze: Supporting Serendipity and Creative Expression in Clipart Compositions", CHI 2014, http://dx.doi.org/10.1145/2556288.2557327, Apr. 26-May 1, 2014, 10 pages.

Bondarenko et al., "Documents at Hand: Learning from Paper to Improve Digital Technologies", CHI 2005, https://doi.org/10.1145/1054972.1054990, Apr. 2-7, 2005, pp. 121-130.

Brown, Tim, "Design thinking", Harvard Business Review, vol. 86, No. 6, Jun. 2008, 2 pages.

Brudy et al., "SurfaceFleet: Exploring Distributed Interactions Unbounded from Device, Application, User, and Time", 33rd Annual ACM Symposium on User Interface Software and Technology, https://doi.org/10.1145/3379337.3415874, Oct. 20-23, 2020, 15 pages.

Brudy, Fredrick Martin, "Designing for Cross-Device Interactions", 2020, 278 pages.

Dix et al., "Externalisation and Design", In Proceedings of the second conference on creativity and innovation in design, https://doi.org/10.1145/2079216.2079220, Oct. 19-21, 2011, 12 pages.

Garner et al., "Problem Interpretation and Resolution via Visual Stimuli: The Use of 'Mood Boards' in Design Education", https://doi.org/10.1111/1468-5949.00250, vol. 20, No. 1, 2001, pp. 57-64.

Getzels, Jacob W, "Problem Finding: A Theoretical Note", Cognitive Science, https://doi.org/10.1207/s15516709cog0302_4, 1979, pp. 167-172.

Harrison et al., "Presenting Physical Things Digitally: New Collecting Practices", Proceedings of the 3rd Biennial Research Through Design Conference, DOI: 10.6084/m9.figshare.4747006, Article 25, 2017, pp. 389-405.

Henderson, Sarah, "Personal Document Management Strategies", In Proceedings of the 10th International Conference NZ Chapter of the ACM's Special Interest Group on Human-Computer Interaction, https://doi.org/10.1145/1577782.1577795, 2009, pp. 69-76.

Hinckley et al., "InkSeine: In Situ Search for Active Note Taking", CHI 2007, https://doi.org/10.1145/1240624.1240666, Apr. 28-May 3, 2007, 10 pages.

Houde et al., "What do Prototypes Prototype?", Handbook of human-computer interaction, https://doi.org/10.1016/8978-044481862-1.50082-0, 1997, 16 pages.

Johnson et al., "The Xerox Star: A Retrospective", https://doi.org/10.1109/2.35211, Sep. 1989, pp. 11-26.

Keller et al., "Collecting with Cabinet: or How Designers Organise Visual Material, Researched through an Experiential Prototype", Design Studies, https://doiorg/10.1016/j.destud.2008.06.001, vol. 30, No. 1, 2009, pp. 69-86.

Kerne, Andruid, "CollageMachine An Interactive Agent of Web Recombination", Leonardo, https://doi.org/10.1162/002409400552801, vol. 33, No. 5, 2000, pp. 347-350.

Kerne et al., "Representing Collections as Compositions to Support distributed Creative Cognition and situated Creative Learning", New Review of Hypermedia and Multimedia, https://doi.org/10.1080/13614560701711859, vol. 13, No. 2, Dec. 2007, pp. 135-162.

Kirsh, David, "The intelligent Use of Space", Artificial Intelligence, https://doi.org/10.1016/0004-3702(94)00017-U, vol. 73, 1995, pp. 31-68.

Koch et al., "May AI?", Design Ideation with Cooperative Contextual Bandits, CHI 2019, Association for Computing Machinery, https://doi.org/10.1145/3290605.3300863, May 4-9, 2019, 12 pages.

Koch et al., "ImageSense: An Intelligent Collaborative Ideation Tool to Support Diverse Human-Computer Partnerships", https://doi.org/10.1145/3392850, vol. 4, No. CSCW1, Article 45, May 2020, pp. 45:1-45:27.

Koch et al., "SemanticCollage: Enriching Digital Mood Board Design with Semantic Labels", http://dx.doi.org/10.1145/3357236.3395494, Jul. 6-10, 2020, pp. 407-418.

Leclerc et al., "Processes of Artistic Creativity: The Case of Isabelle Hayeur", In Proceedings of the Annual Meeting of the Cognitive Science Society, vol. 26, 2004, pp. 801-806.

Star, Susan Leigh, "This is Not a Boundary Object: Reflections on the Origin of a Concept", Science, Technology & Human Values, DOI: 10.1177/0162243910377624, vol. 35, No. 5, 2010, pp. 601-617.

Lim et al., "The Anatomy of Prototypes: Prototypes as Filters, Prototypes as Manifestations of Design Ideas", ACM Transactions on Computer-Human Interaction, DOI 10.1145/1375761.1375762, vol. 15, No. 2, Article 7, Jul. 2008, pp. 7:1-7:27.

Linder et al., "Everyday Ideation: All of My Ideas Are On Pinterest", Proceedings of the SIGCHI conference on human factors in computing systems, https://doi.org/10.1145/2556288.2557273, Apr. 26 -May 1, 2014, pp. 2411-2420.

Lindley et al., "Towards a Tool for Design Ideation: Insights from Use of SketchStorm", Proceedings of the 27th BCS Conference on Human Computer Interaction, https://doi.org/10.14236/ewic/HCI2013.13, 2013, 10 pages.

Vera, Andres Lucero, "Co-designing interactive spaces for and with designers : supporting mood-board making", DOI:10.6100/IR641288, Jan. 1, 2009, 229 pages.

Lucero, Andres, "Framing, Aligning, Paradoxing, Abstracting, and Directing: How Design Mood Boards Work", https://doiorg/10.1145/2317956.2318021, Jun. 11-15, 2012, pp. 438-447.

Lucero et al., "Augmenting Mood Boards: Flexible and Intuitive Interaction in the Context of the Design Studio", Second Annual IEEE International Workshop on Horizontal Interactive Human-Computer System, DOI 10.1109/TABLETOP.2007.17, 2007, pp. 147-154.

Lucero et al., "Funky Wall: Presenting Mood Boards Using Gesture, Speech and Visuals", https://doiorg/10.1145/1385569.1385650, May 28-30, 2008, pp. 425-428.

Marchionini, Gary, "Exploratory Search: From Finding To Understanding", https://doiorg/10.1145/1121949.1121979, Communications of The ACM, vol. 49, No. 4, Apr. 2006, pp. 41-46.

Clark, Bryan, "Milanote", Retrieved from https://milanote.com, on Mar. 28, 2023, 17 pages.

"MURAL", Retrieved from https://www.mural.co/, on Apr. 13, 2023, 13 pages.

Nazzal, Lamies J., "Engineering Creativity: Differences in Creative Problem Solving Stages Across Domains", Doctoral Dissertations, 2015, 133 pages.

(56)　　　　　　References Cited

OTHER PUBLICATIONS

Olsen Jr., Dan R., "Evaluating User Interface Systems Research", https://doi.org/10.1145/1294211.1294256, Oct. 7-10, 2007, pp. 251-258.

Palani et al., "I don't want to feel like I'm working in a 1960s factory": The Practitioner Perspective on Creativity Support Tool Adoption, https://doi.org/10.1145/3491102.3501933, Apr. 29-May 5, 2022, 18 pages.

"Pinterest", Retrieved from https://www.pinterest.com, on Mar. 28, 2023, 1 page.

Porcheron et al., "Co-Curator: Designing for Mobile Ideation in Groups", In Proceedings of the 20th International Academic Mindtrek Conference, DOI: http://dx.doi.org/10.1145/2994310.2994350, Oct. 17-18, 2016, 9 pages.

Reiter-Palmon et al., "Problem Construction and Creativity: The Role of Ability, Cue Consistency, and Active Processing", http://dx.doi.org/10.1207/s15326934crj1001_2, vol. 10, No. 1, 1997, pp. 9-13.

Reiter-Palmon et al., "Solving Everyday Problems Creatively: The Role of Problem Construction and Personality Type", http://dx.doi.org/10.1207/s15326934crj1103_1, vol. 11, No. 3, 1998, pp. 187-197.

Thudt et al., "The Bohemian Bookshelf: Supporting Serendipitous Book Discoveries through Information Visualization", https://doi.org/10.1145/2207676.2208607, May 5-10, 2012, pp. 1461-1470.

Watkins et al., "Digital Collections and Digital Collecting Practices", Digital Collections, Practice & Legacy, http://dx.doi.org/10.1145/2702123.2702380, Apr. 18-23, 2015, pp. 3423-3432.

Getzels et al., "The creative vision: A longitudinal study of problem finding in art", https://doi.org/10.2307/430755, 1976, pp. 96-98.

\* cited by examiner

Client Device 120

File System
121

Media Files
122

Mood Cube
Application
123

Render
Engine
124

UI
Generator
125

I/O
Devices
126

146

147

Server System 140

Database
141

Media Files
142

Asthetic Assets
143

Asset
Extractor
144

Suggestion
Generator
145

TECHNIQUES FOR GENERATING IMMERSIVE SPACES THAT ENABLE INSPIRATIONAL MATERIALS TO BE COLLECTED, DISCOVERED, AND ENVISIONED

CROSS-REFERENCE TO RELATED APPLICATIONS

This application claims priority benefit of the U.S. Provisional patent application titled, "TECHNIQUES FOR GENERATING IMMERSIVE SPACES THAT ENABLE INSPIRATIONAL MATERIALS TO BE COLLECTED, DISCOVERED, AND ENVISIONED," filed on Jun. 3, 2022 and having Ser. No. 63/348,758. The subject matter of this related application is hereby incorporated herein by reference.

BACKGROUND

Field of the Various Embodiments

The various embodiments relate generally to computer science and complex software applications and, more specifically, to techniques for generating immersive spaces that enable inspirational materials to be collected, discovered, and envisioned.

DESCRIPTION OF THE RELATED ART

Creative practitioners, such as visual designers, cinematographers, artists, and video game designers, oftentimes collect inspiration material to better understand a design problem at hand and/or define a cohesive aesthetic that surrounds a design problem. As part of the creative process, the collected materials have to be made visible in order to better frame the design problem, align all stakeholders, contrast ideas, and direct the trajectory of a project. Such material collection and display efforts are usually implemented though mood boards, which are two-dimensional image collages or creative workspaces that can be used to create a cohesive aesthetic from the collected materials. However, mood boards cannot represent certain media types collected by creative practitioners, such as three-dimensional models, audio content, and videos. Consequently, the contribution of these media types to a creative project can be undermined or ignored in the design process, even though instances of these types of media can beneficially contribute to a given creative project. To expand the types of materials that can be collected and displayed using mood boards, digital mood boards have been developed. Digital mood boards can advantageously display collected digital material within a virtual workspace, such as images, thematically relevant text, and links to audio and/or video content.

One drawback of digital mood boards is that they typically are limited to displaying two-dimensional static images, short segments of text, and links to multi-media content. Consequently, separate software applications typically have to be implemented for a creative practitioner to experience other relevant types of collected materials, such as audio recordings, video recordings, or three-dimensional models. Because these software applications are not integrated applications, the materials collected and experienced using the software application cannot be incorporated into the creative workspace of a digital mood board. As a result, collected materials that have audio, video, and/or three-dimensional digital components usually do not contribute directly to the overall aesthetically immersive experience, which is the ultimate goal of any mood board.

Another drawback is that conventional digital mood boards do not provide a way to process large numbers of collected digital materials in a way that allows the collected digital materials to contribute to the target aesthetics of the digital mood boards. For example, a creative practitioner can easily import any number of digital images into a given digital mood board as part of a collection process. However, a conventional digital mood board does not provide an effective way to extract the specific pieces of information or properties from each digital image that contributes to the overall aesthetic of a given project, such as a color found in an image, a visual texture found in an image, or the subject of an image. Instead, the creative practitioner typically has to extract visual properties of interest from each individual image or instance of collected digital material, which can be tedious and error-prone and oftentimes requires the use of specialized software tools.

As the foregoing illustrates, what is needed in the art are more effective techniques for collecting and interacting with digital materials.

SUMMARY

A computer-implemented method for generating a virtual collection of digital materials includes: generating a virtual three-dimensional (3D) design workspace; and, in response to a first operation that is associated with a first media file: automatically generating a virtual 3D representation of the first media file; and automatically incorporating the virtual 3D representation of the first media file into the virtual 3D design workspace At least one technical advantage of the disclosed techniques relative to the prior art is that the disclosed techniques enable a virtual design workspace to be generated that can incorporate collected materials having audio, video, and/or three-dimensional components. Accordingly, the disclosed techniques allow media types other than two-dimensional images to be included within the virtual design workspace by a user to create a cohesive aesthetic. A further advantage of the disclosed techniques is that collected materials can be automatically decomposed into individual aesthetic assets (e.g., colors, visual textures, sounds, shapes, and key words) when imported into a virtual design workspace. As a result, creative simulations and prototypes based on these decomposed aesthetic assets can be more easily generated relative to what can be achieved using prior art approaches. Further, user inspiration through remixing and juxtaposing of these types of aesthetic assets is facilitated. These technical advantages provide one or more technological advancements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

For clarity, identical reference numbers have been used, where applicable, to designate identical elements that are common between figures. It is contemplated that features of one embodiment may be incorporated in other embodiments without further recitation.

DETAILED DESCRIPTION

In the following description, numerous specific details are set forth to provide a more thorough understanding of the various embodiments. However, it will be apparent to one of skill in the art that the inventive concepts may be practiced without one or more of these specific details.

System Overview

Figure 1:
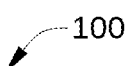
FIG. 1 illustrates a computing system configured to implement one or more aspects of the various embodiments.

FIG. 1 illustrates a computing system 100 configured to implement one or more aspects of the various embodiments. Computing system 100 is configured to generate a virtual three-dimensional (3D) virtual design workspace (referred to herein as a "mood cube") that provides a virtual creative environment with the ability to integrate collected materials of disparate media types into a cohesive aesthetic. The virtual creative environment also provides creative suggestions and a wide variety of aesthetic remixing opportunities to the user. In the embodiment illustrated in FIG. 1, computing system 100 includes a client device 120 and a server system 140, which are communicatively coupled via one or more communication networks (not shown). The one or more communication networks can each include a wireless local area network (WLAN), a cellular network, a wired communication network (such as a local area network), the Internet, or any combination thereof.

Client device 120 generates a user interface that includes the virtual 3D workspace (mood cube). Client device 120 also renders visual representations of aesthetic assets within the mood cube, enables 3D interactions with such aesthetic assets (e.g., positioning, rotating, resizing, and the like), and displays and enables interactions with suggested aesthetic assets. Client device 120 can be implemented as a computing device, such as a smartphone, laptop computer, desktop computer, electronic tablet, and/or the like. An example embodiment of such a computing device is described below in conjunction with FIG. 7. In the embodiment illustrated in FIG. 1, client device 120 includes a file system 121, a mood cube application 123, and input/output (I/O) devices 126.

File system 121 stores media files 122, which can include any technically feasible digital collected materials, such as image files, audio files, video files, 3D-model files, and the like. In some embodiments, media files 122 include digital materials that have been manually collected by a particular user, for example, via Internet searches. Alternatively or additionally, in some embodiments, media files 122 include digital materials the particular user has employed in previous projects. Embodiments of a media file 122 is described below in conjunction with FIG. 2.

Figure 2:
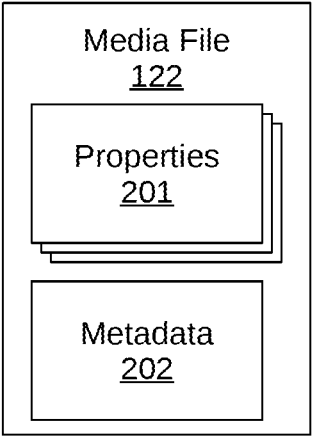
FIG. 2 is a more detailed illustration of one of the media files of FIG. 1, according to various embodiments.

FIG. 2 is a more detailed illustration of a particular media file 122 of FIG. 1, according to various embodiments. As shown, media file 122 includes a plurality of properties 201. According to various embodiments, some or all properties 201 of a particular media file 122 can be employed by computing system 100 to generate aesthetic assets when extracted from that particular media file 122. In some embodiments, such aesthetic assets can then be positioned and oriented within a mood cube by a user to contribute to a specific aesthetic.

Generally, each type of media file 122 includes different properties 201 that can each be employed as an aesthetic asset in a mood cube. Thus, image files, audio files, video files, and 3D-model files may each have different properties 201 associated therewith. In some instances, properties 201 include properties that are typically inherent in a media file. For example, in the case of an image file, inherent properties may include a color, an image, and/or text that is included in the image file. In some embodiments, such inherent properties are detected by computing system 100, for example via asset extractor 144. In some instances, properties 201 include properties that are generated by computing system 100 for a particular media file. For example, in the case of an image file, generated properties for a particular media file can include object identifications or image classifications that are returned as search results. In some embodiments, such generated properties can be generated via asset extractor 144 and/or suggestion generator.

For example, in some embodiments, properties 201 of an image file can include one or more colors included in the image file, one or more visual textures included in the image file, one or more items of audio content associated with the image file, and/or one or more key words or phrases associated with the image file. In such embodiments, the key words or phrases can be extracted from metadata 202 associated with the image file, such as an artist associated with the image file, title language associated with the image file, a date or location associated with the image file, and/or a subject or other descriptive language associated with the image file. Alternatively or additionally, in some embodiments, the key words or phrases can be based on the results of a search using the image file. In such embodiments, the key words or phrases can be labels, object identifications, and/or image classifications that are returned as search results for the search using the image file. For example, in some embodiments, such a search is performed by asset extractor 141 if FIG. 1, as described below.

In another example, in some embodiments, properties 201 of an audio file can include one or more audio excerpts from the audio file and/or one or more images associated with the audio file. In such embodiments, the one or more images can include, for example, an image of a musician associated with the audio file, an album cover associated with the audio file, an image otherwise associated with musical content included in the audio file, an image of something that generates a portion of the audio content included in the audio file, and/or an image of an object associated with audio content included in the audio file. Alternatively or additionally, in some embodiments, properties 201 of an audio file can include one or more key words or phrases associated with the audio file. In such embodiments, the key words or phrases can be extracted from metadata 202 associated with the image file, such as an artist associated with the audio file, title language associated with the audio file, a date or location associated with the audio file, and/or a subject or other descriptive language associated with the audio file. In some embodiments, the key words or phrases can be based on the results of a search using the audio file. For example, in some embodiments, such a search is performed by asset extractor 141 if FIG. 1, as described below.

In another example, in some embodiments, properties 201 of a video file can include one or more colors associated with specific frames of a video included in the video file, one or more audio excerpts from the video file and/or one or more images associated with the video file, such as a selection of frames taken from the video file. In some embodiments, the selection of frames taken from the video file can be chosen to form a short "film reel" and, in other embodiments, the selection of frames taken from the video file can be chosen to show separate highlight frames from throughout the video file. In some embodiments, the one or more images can include, for example, an image of an artist associated with the video file, and/or an image or poster associated with content included in the video file. Alternatively or additionally, in some embodiments, properties 201 of a video file can include one or more key words or phrases associated with the video file. In such embodiments, the key words or phrases can be extracted from metadata 202 associated with the video file, such as an artist associated with the video file, title language associated with the video file, a date or location associated with the video file, and/or a subject or other descriptive language associated with the video file. In some embodiments, the key words or phrases can be based on the results of a search using the video file and/or individual frames from the video file. For example, in some embodiments, such a search is performed by asset extractor 141 if FIG. 1, as described below.

In another example, in some embodiments, properties 201 of a 3D-model file can include one or more of a 3D rendering of a 3D model included in the 3D-model file, one or more colors associated with a 3D model included in the 3D-model file, audio content associated with an object included in the 3D-model file, and/or one or more images associated with the 3D-model file, such as selected 2D views of a 3D model included in the 3D-model file. Alternatively or additionally, in some embodiments, properties 201 of a 3D-model file can include one or more key words or phrases associated with the 3D-model file. In such embodiments, the key words or phrases can be extracted from metadata 202 associated with the 3D-model file, title language associated with the 3D-model file, a date or location associated with the 3D-model file, and/or a subject or other descriptive language associated with the 3D-model file. In some embodiments, the key words or phrases can be based on results of a search using the 3D-model file and/or selected 2D-views of a 3D model included in the 3D-model file. For example, in some embodiments, such a search is performed by asset extractor 141 if FIG. 1, as described below.

Returning to FIG. 1, mood cube application 123 performs various actions associated with the embodiments, including generating a particular mood cube and generating a user interface (UI) for displaying the mood cube and enabling user interactions with the mood cube. To that end, in some embodiments, mood cube application 123 includes a render engine 124 and a UI generator 125. In the embodiment illustrated in FIG. 1, mood cube application 123 is implemented as a web application to facilitate communications with server system 140. In other embodiments, mood cube application 123 is implemented as any other technically feasible software application capable of performing the actions described herein.

Render engine 124 performs operations for generating the 3D virtual design workspace of a mood cube. For example, in some embodiments, render engine 124 renders a virtual 3D representation of the mood cube itself as well as virtual 3D representations of aesthetic assets that are imported into the mood cube. Render engine 124 generates these 3D representations for display to the user, for example via a UI displayed by I/O devices 126. The virtual 3D representations generated by render engine 124 can be for any technically feasible collected digital material, including image files and/or individual properties 201 of image files, audio files and/or individual properties 201 of audio files, video files and/or individual properties 201 of video files, 3D-model files and/or individual properties 201 of 3D-model files, and the like.

In an example, in some embodiments, when a user imports a 2D rectangular image into a mood cube as an aesthetic asset, render engine 124 generates a 3D cuboid that includes a face on which the 2D image is displayed. Thus, via the 3D cuboid, the 2D image can be positioned and oriented within the mood cube and/or resized as desired by the user to best achieve a specific aesthetic. Further, when a user imports a specific property 201 of an image file, such as a color or visual texture, render engine 124 generates a 3D cuboid that displays the specific property, such as the color or visual texture, on one or more faces of the 3D cuboid.

In another example, in some embodiments, when a user imports an audio file into a mood cube as an aesthetic asset, render engine 124 generates a 3D cube or cuboid that represents the audio file. In such embodiments, the 3D cube or cuboid representing the audio file may include a face or faces displaying an image and/or text associated with the audio file. Thus, via the 3D cuboid, the 2D image can be positioned and oriented within the mood cube and/or resized as desired by the user to best achieve a specific aesthetic. In some embodiments, a portion of audio content included in the file is played when the face or faces are visible that display the image and/or text associated with the audio file. In some embodiments, the volume level of the audio content varies as a function of the orientation of the 3D cuboid relative to a viewing direction by the user. In such embodiments, when a front face of the 3D cuboid associated with the audio file is directly facing the user, the volume level of the audio content is at a maximum level, and when the front face is not visible to the user, the volume level of the audio content is at a minimum level.

In another example, in some embodiments, when a user imports a 3D-model file into a mood cube as an aesthetic asset, render engine 124 renders a 3D model based on the 3D-model file. The 3D model can then be positioned and oriented within the mood cube by the user via tools associated with the UI for the mood cube. Thus, a user can easily incorporate a 3D model into a virtual 3D workspace without using modeling software to generate such a 3D model manually. As with the 3D representations render engine 124 generates for other aesthetic asset, the 3D-model rendered by render engine 124 can be positioned and oriented within the mood cube and/or resized as desired by the user to best achieve a specific aesthetic. Similar to image files, when a user imports a specific property 201 of a 3D-model file, such as a color or visual texture, render engine 124 generates a 3D cuboid that displays the specific property, such as the color or visual texture, on one or more faces of the 3D cuboid.

In another example, in some embodiments, when a user imports a video file into a mood cube as an aesthetic asset, render engine 124 generates a 3D cube or cuboid that represents the audio file. In such embodiments, the 3D cube or cuboid representing the video file may include a face or faces displaying one or more frames associated with the video file, such as a short film reel or a series of selected highlight frames. Thus, via the 3D cuboid, video can be positioned and oriented within the mood cube and/or resized as desired by the user to best achieve a specific aesthetic. In some embodiments, audio content associated with the video file can vary in volume as a function of the orientation of the 3D cuboid relative to a viewing direction by the user.

UI generator 125 performs operations for generating a UI for the display of a mood cube and for receiving user interactions from the mood cube. For example, in some embodiments, UI generator 125 generates a 2D UI for displaying the virtual 3D virtual workspace of a mood cube in a 2D format. In such embodiments, the UI is displayed by one or more of I/O devices 126. Further, in such embodiments, user inputs are received by client device 120 via I/O devices 126, such as a mouse, keyboard, touchscreen, trackpad, and the like. Alternatively or additionally, in some embodiments, UI generator 125 generates a 3D UI for displaying the virtual 3D virtual workspace of a mood cube, so that the UI is perceived in 3D by a user. In such embodiments, the one or more of I/O devices 126 that display the UI in a 3D format include any technically feasible virtual reality and/or augmented reality display system, such as a head-mounted display. Further, in such embodiments, a user provides inputs via one or more I/O devices 126 that are suitable for virtual reality and/or augmented reality applications, such as motion trackers, joysticks, track pads, sensing gloves, device control buttons, haptic feedback systems, body suits, and/or the like.

Server system 140 performs certain functions that enable server system 140 to extract aesthetic assets from media files 142 and to make creative suggestions to the user. To that end, in the embodiment illustrated in FIG. 1, server system 140 includes a database 141, an asset extractor 144, and a suggestion generator 145 as shown. Server system 140 can be implemented as a computing device, such as a smartphone, laptop computer, desktop computer, electronic tablet, and/or the like. An example embodiment of such a computing device is described below in conjunction with FIG. 7.

Database 141 stores media files 142, which can include any technically feasible digital collected materials received or collected by server system 140, including media files 122 that are imported by a user into a mood cube and media files that are collected by suggestion generator 145. In some embodiments, media files 142 can include image files, audio files, video files, 3D-model files, and the like. In some embodiments, media files 142 further include aesthetic assets 143. In such embodiments, aesthetic assets 143 can be aesthetic assets that have been extracted from media files 122, such as extracted aesthetic assets 146. Alternatively or additionally, in some embodiments, media files 142 can be suggested aesthetic assets 147 that have been extracted from digital material collected by suggestion generator 145.

Asset extractor 144 determines one or more properties 201 (shown in FIG. 2) of a media file received by server system 140. Such media files can include media files 122, which are imported into a mood cube by a user, and/or media files 142, which are collected by suggestion generator 145 based on media files 122. In addition, asset extractor 144 extracts the one or more properties determined for a media file and generates an aesthetic asset for each such property.

As noted above, properties 201 of a particular media file can vary depending on media file type and on the content included in the particular media file, and can include colors, visual textures, key words or phrases, images, video frames, and the like. Thus, asset extractor 144 automatically decomposes the digital content in a media file into related lower-level elements that can greatly assist the user in remixing or otherwise combining different thematic elements of various media files that have been imported into a mood cube.

In some embodiments, asset extractor 144 determines one or more properties 201 of a 3D-model file based on one or more 2D images that are generated from information included in the 3D-model file. For example, in some embodiments, asset extractor 144 generates one or more 2D views of a 3D model included in the 3D-model file, such as a front view of the 3D model, a side view of the 3D model, an isometric view of the 3D model, and the like. In such embodiments, asset extractor 144 can then perform conventional image analysis, for example via one or more machine-learning models, to classify and/or detect objects within each of the one or more views. Based on such 2D image classifications and/or detected objects, asset extractor 144 can generate key words and phrases and/or search for related images, objects, and other digital materials that are thematically similar to information included in the 3D model file. Thus, in such embodiments, asset extractor 144 can leverage existing search capabilities that are intended for 2D images to search for suggested suitable aesthetic assets for a 3D-model file that a user imports into a mood cube.

Suggestion generator 145 generates one or more suggested aesthetic assets 147 based on media files 122 that are imported into a mood cube by a user. In some embodiments, suggestion generator 145 also generates one or more suggested aesthetic assets 147 based on extracted aesthetic assets 146 that are determined by asset extractor 144. In some embodiments, suggestion generator 145 generates suggested aesthetic assets 147 based on a search for thematically related digital materials. For example, in some embodiments, suggestion generator 145 performs an Internet or database search using key words or phrases associated with a particular media file 122 that is imported into a mood cube. In some embodiments, when a media file 122 is a 3D-model file, suggestion generator 145 performs a search based on one or more 2D views of a 3D model included in the 3D-model file, as described above for asset extractor 144.

Virtual 3D Workspace

Figure 3:
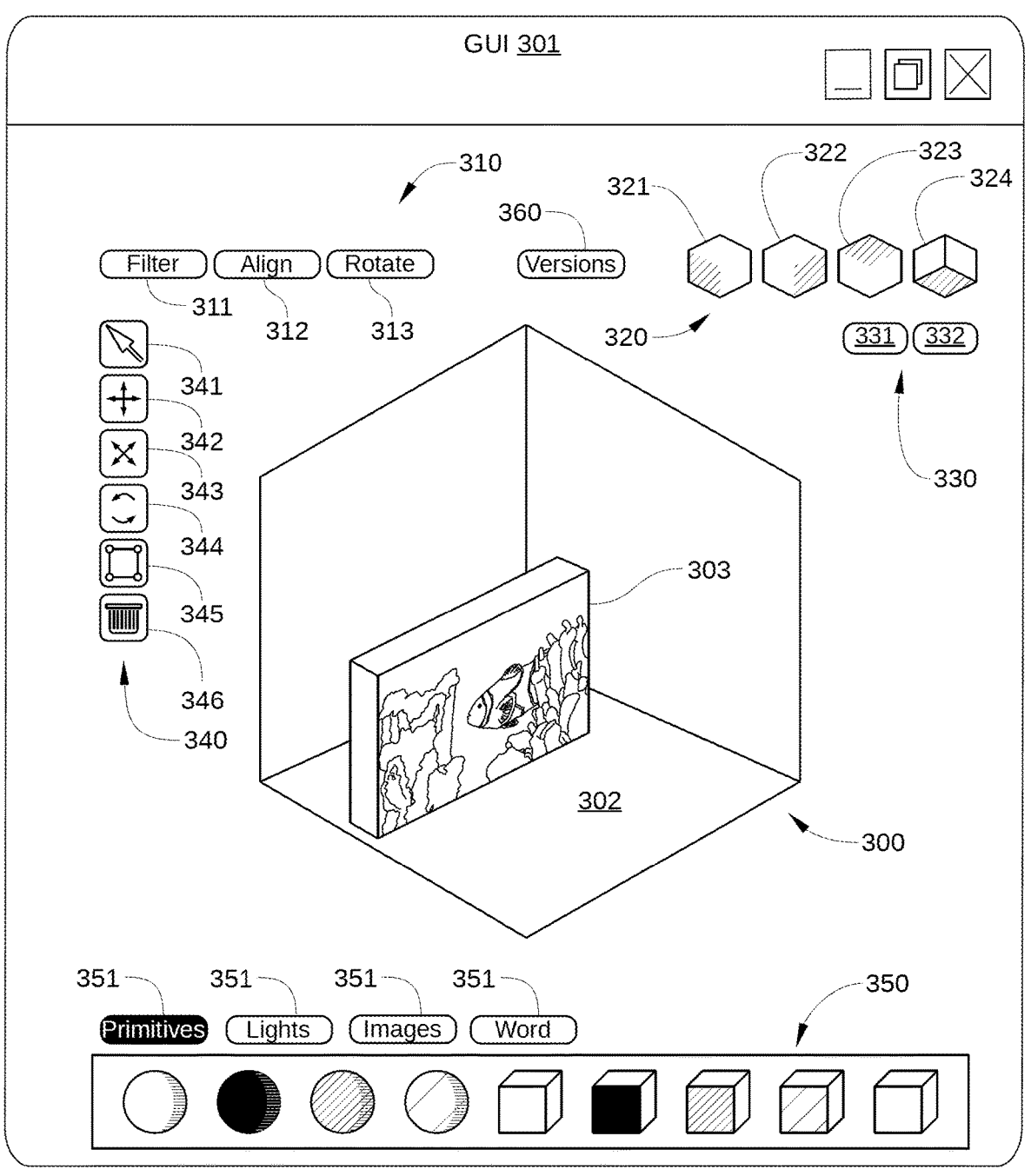
FIG. 3 schematically illustrates a virtual three-dimensional design workspace, according various embodiments.

FIG. 3 schematically illustrates a virtual three-dimensional design workspace ("mood cube") 300, according various embodiments. Mood cube 300 provides a creative design workspace 302 in which multimedia materials can be incorporated into a cohesive aesthetic by a user, including image files, audio files, video files, 3D-model files, and the like. Because the use of and interactions with mood cube 300 are implemented with an intuitive UI, a low threshold of technical ability is required on the part of the user to perform various steps in the creative process via mood cube 300. For example, using mood cube 300, a user can readily find and collect thematically pertinent digital materials of disparate media types, arrange different aesthetic assets based on the collected materials in a creative workspace, remix and/or juxtaposition existing and newly suggested aesthetic assets in the creative workspace, and quickly perform experiments and generate prototypes without relying on the use of additional editing and content-creating software applications.

In the embodiment illustrated in FIG. 3, mood cube 300 is depicted within a UI 301. As shown, UI 301 includes various selection fields that enable user interactions with one or more aesthetic assets 303 located within mood cube 300, thereby forming a scene having a particular aesthetic. As aesthetic assets 303 are added, removed, repositioned, and/or oriented within mood cube 300, the aesthetic of the scene can change.

According to various embodiments, UI 301 includes a set of scene-wide manipulation inputs 310, a set of camera views 320, a set of color selectors 330, and a toolbar 340 that includes various inputs for manipulating aesthetic asset 303. UI 301 further includes a suggestion panel 350 for providing extracted aesthetic assets (such as extracted aesthetic assets 146 in FIG. 1) that are based on an aesthetic asset 303 that has been selected in mood cube 300. Alternatively or additionally, in some embodiments, suggestion panel 350 further provides suggested aesthetic assets, such as suggested aesthetic assets 147 in FIG. 1. In some embodiments, elements of UI 301, such as scene-wide manipulation inputs 310, camera views 320, color selectors 330, and/or toolbar 340 are implemented via a real-time 3D engine, such as Babylon.js. In such embodiments, the real-time 3D engine facilitates the display of 3D graphics in a web browser via HTML5.

Scene-wide manipulation inputs 310 include input fields that enable expansive modifications to a scene in mood cube 300 by universally modifying some or all aesthetic assets currently disposed within mood cube 300. Scene-wide manipulation inputs 310 include a filtering button 311, an alignment button 312, and a rotation button 313. In some embodiments, the effects of filtering button 311, alignment button 312, and/or rotation button 313 are applied to all aesthetic assets 303 that are disposed within mood cube 300. Alternatively or additionally, in some embodiments, the effects of filtering button 311, alignment button 312, and/or rotation button 313 are applied to aesthetic assets 303 within mood cube 300 that have been specifically selected by the user.

Filtering button 311 enables one or more filters (not shown) to be employed that can be applied to the aesthetic assets 303 of mood cube 300. Each filter applies a change to the target aesthetic asset, such as a displayed appearance (e.g., metallic, smooth, or some other surface texture), a color change, or a lighting change. In some embodiments, the change in displayed appearance caused by filtering button 311 can be selected from textures associated with suggested aesthetic assets. Similarly, in some embodiments, a color change caused by filtering button 311 can be selected from a color palette based on suggested aesthetic assets. Alternatively or additionally, in some embodiments, a color change caused by filtering button 311 can be selected from a normal color palette. In some embodiments, a lighting change caused by filtering button 311 can be selected from a color palette based on suggested aesthetic assets and/or on a normal color palette. In some embodiments, the lighting change caused by filtering button 311 can cause the addition, removal, and/or modification of a light source disposed within mood cube 300 (e.g., intensity of illumination, extend of illumination, and/or direction of illumination).

Alignment button 312 and rotation button 313 enable spatial rearrangement of some or all of the aesthetic assets 303 of mood cube 300. Specifically, alignment button 312 enables a user to move some or all aesthetic assets 303 to one edge of mood cube 300, while rotation button 313 enables a user to orient some or all aesthetic assets 303 to face a specified direction.

Camera views 320 include input fields that reset the "camera," or user viewing direction, to a specific angle. In the embodiment illustrated in FIG. 3, specific angles for resetting the user viewing direction include a left side view 321, a right side view 322, a top view 323, and an isometric view 324. Color selectors 330 include an input field 331 that enables the user to set the current color of the background of mood cube 300 and an input field 332 that enables the user to set the current color of mood cube 300 itself.

Toolbar 340 includes various inputs or selection fields for manipulating a particular aesthetic asset 303 within mood cube 300. In the embodiment illustrated in FIG. 3, toolbar 340 includes a cursor tool 341, a positioning tool 342, a scaling tool 343, a rotate tool 344, a bounding box tool 345, and a deletion tool 346. In some embodiments, toolbar 340 can further include one or more additional tools for performing typical 3D object manipulations, such as duplicating, editing, and the like. Cursor tool 341 enables the user to click and drag a specific aesthetic asset 303 within mood cube 300. Positioning tool 342 enables the user to move a specific aesthetic asset 303 in a specified direction (e.g., vertically, horizontally, and the like). Scaling tool 343 enables the user to rotate a specific aesthetic asset 303 within mood cube 300 as desired. Bounding box tool 345 enables the user to select a corner of an aesthetic asset 303 and resize the aesthetic asset as desired. Deletion tool 346 enables the user to remove a specific aesthetic asset 303 from mood cube 300.

Suggestion panel 350 includes various selection fields for viewing and implementing various suggested aesthetic assets, such as suggested aesthetic assets 147 in FIG. 1. In some embodiments, suggestion panel 350 includes multiple categories 351 of suggested aesthetic assets, such as "Primitives," "Lights," "Models," "Images," and "Words." In the instance depicted in FIG. 3, a selection of geometric primitives (e.g., spheres, cubes, and the like) are shown as suggestions in suggestion panel 350. Each of the geometric primitives includes one or more properties extracted from an imported media file or suggested aesthetic asset, such as a color or visual texture. When the "Lights" category is selected by a user, suggestion panel 350 displays various suggested colors of lights that can be imported into mood cube 300 to illuminate a specific region of mood cube 300. When the "Models" category is selected by a user, suggestion panel 350 displays various suggested 3D models that can be imported into mood cube 300. When the "Images" category is selected by a user, suggestion panel 350 displays various suggested 2D images that can be imported into mood cube 300. When the "Words" category is selected by a user, suggestion panel 350 displays various cuboids that can be imported into mood cube 300, where each such cuboid has suggested thematically relevant text displayed on a face thereof.

In some embodiments, UI 301 further includes a version-tracking capability. In such embodiments, UI 301 includes a version management field 360 that enables a user to manage and view saved versions of mood cube 300. In such embodiments, selection of version management field 360 enables one or more version-management operations, such as saving the current version of mood cube 300 and viewing one or more previously saved versions of mood cube 300. One such embodiment is described below in conjunction with FIG. 4.

Figure 4:
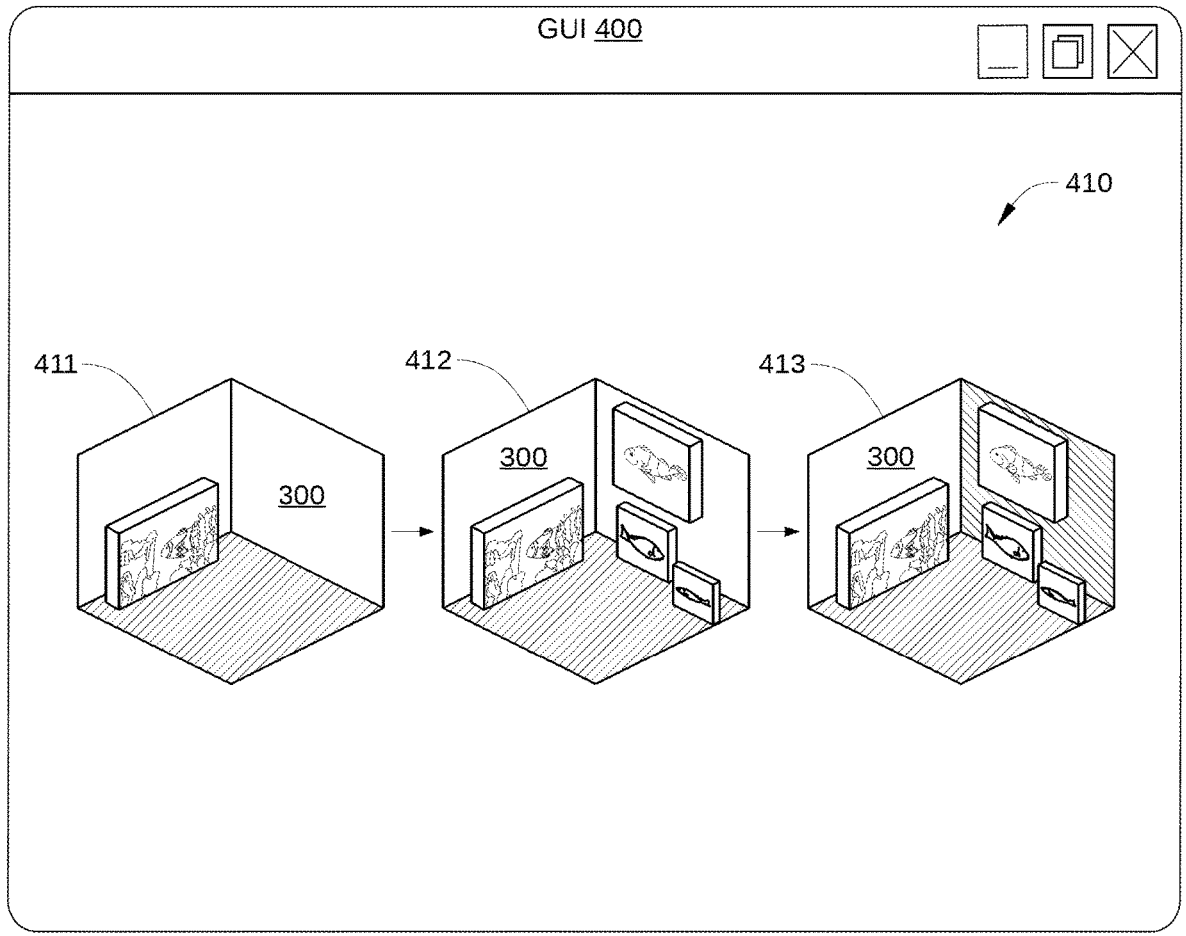
FIG. 4 schematically illustrates a version review window associated with the GUI of FIG. 3, according to various embodiments.

FIG. 4 schematically illustrates a version review window 400 of GUI 301, according to various embodiments. In some embodiments, version review window 400 is displayed in response to a user selection of version management field 360 in FIG. 3. As shown, version review window 400 displays one or more previously saved versions 410 of mood cube 300. In the embodiment illustrated in FIG. 4, previously saved versions 410 include a first version 411 of mood cube 300, a second version 412 of mood cube 300, and a third version 413 of mood cube 300. In such embodiments, previously saved versions 410 enable a user to compare and contrast various versions of mood cube 300, which can facilitate the creative process.

Virtual 3D Workspace Interactions

Figure 5:
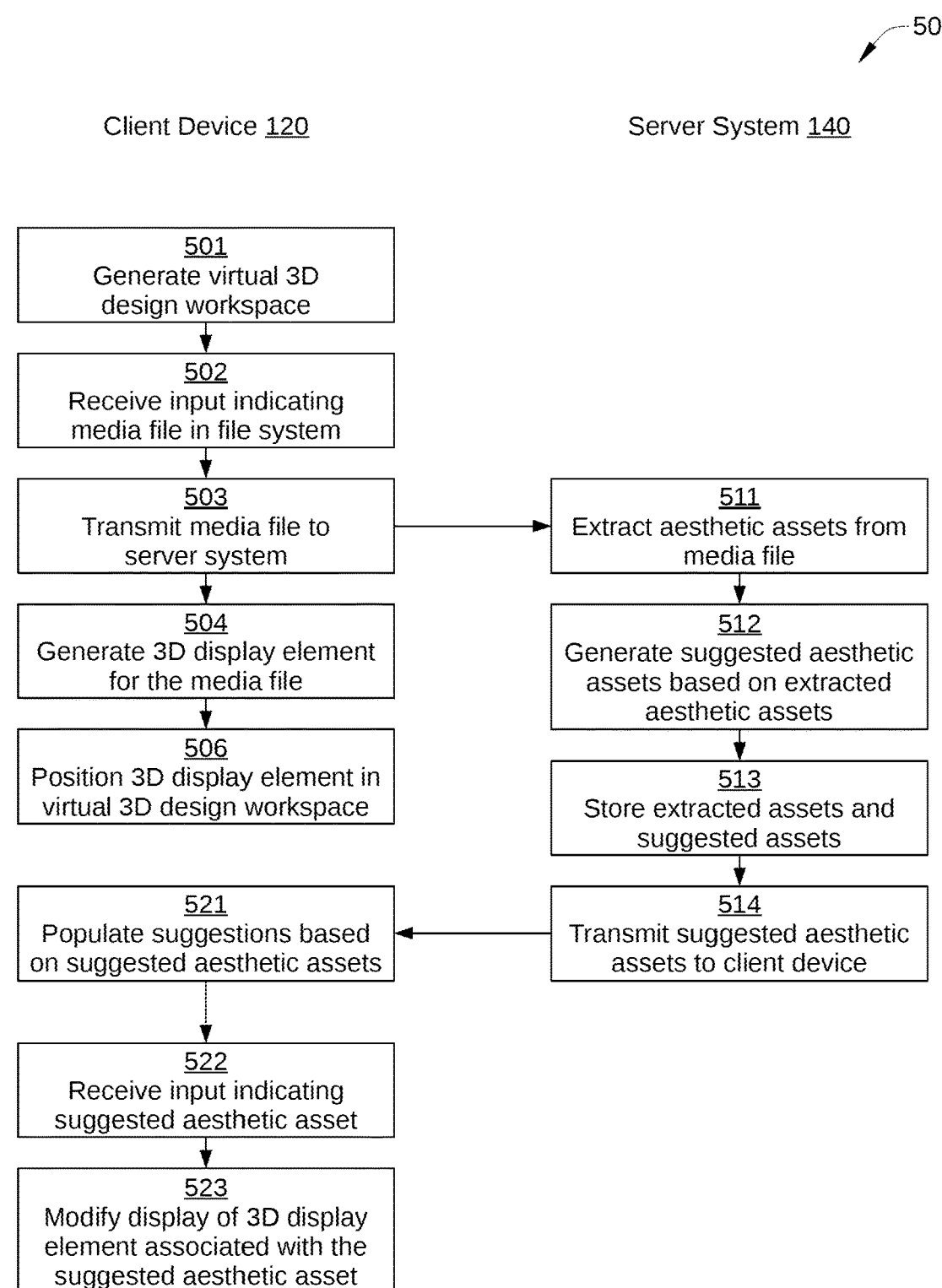
FIG. 5 sets forth a flowchart of method steps for generating a virtual collection of digital materials and interacting with a virtual 3D workspace, according to various embodiments.

FIG. 5 sets forth a flowchart of method steps for generating a virtual collection of digital materials and interacting with a virtual 3D workspace, according to various embodiments. FIGS. 6A-6D illustrate various method steps associated with the method of FIG. 5, according to various embodiments. Although the method steps are described in conjunction with the system of FIGS. 1-3, persons skilled in the art will understand that any suitable system configured to perform the method steps, in any order, is within the scope of the embodiments.

Figure 6A:
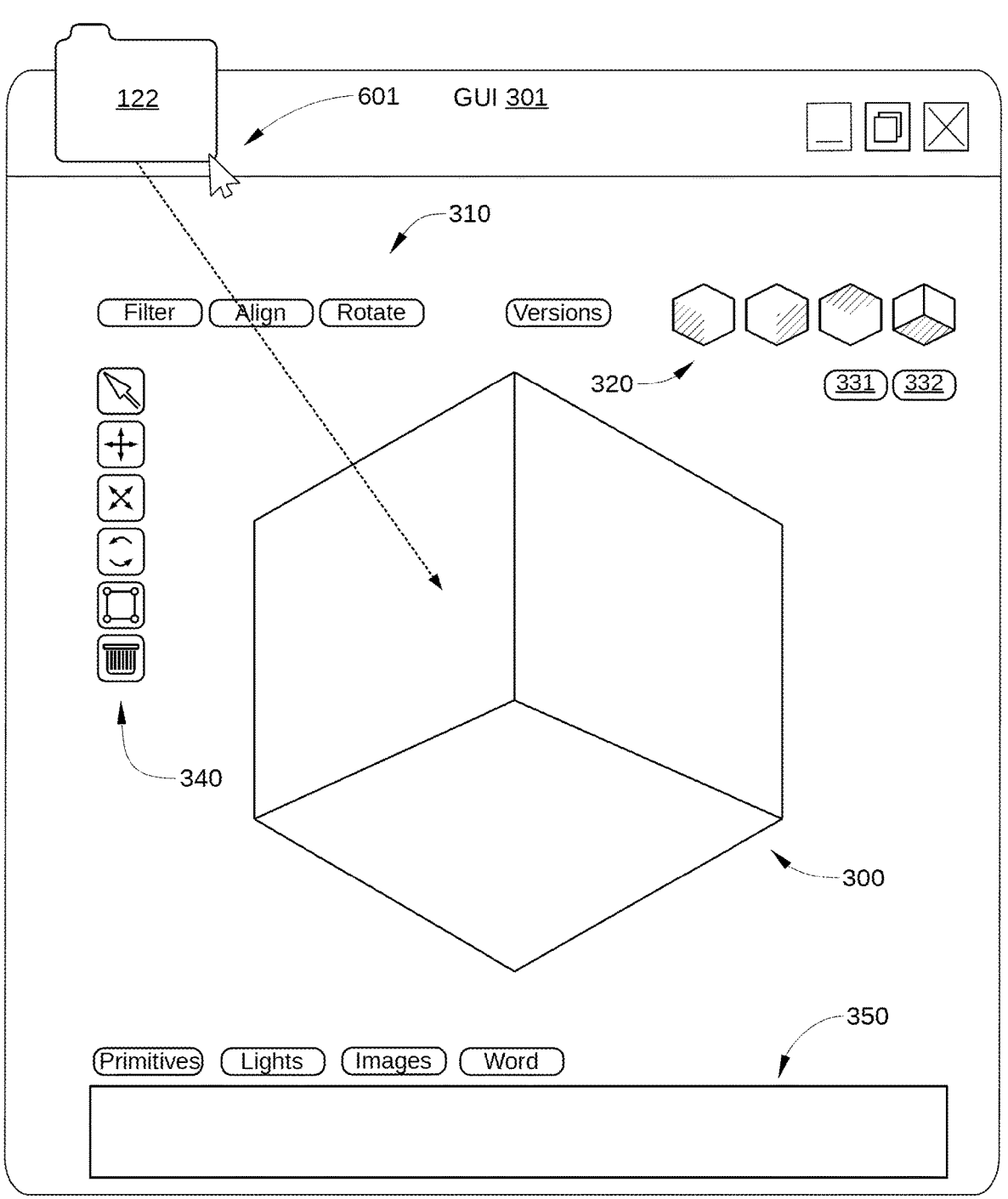
FIGS. 6A-6D illustrate various steps associated with the method of FIG. 5, according to various embodiments.

A computer-implemented method 500 begins at step 501, where mood cube application 123 generates a virtual 3D design workspace, such as mood cube 300. In step 502, mood cube application 123 receives an input indicating a media file, such as a media file 122 in file system 121. For example, in some embodiments, a user performs a drag-and-drop input operation 601 to select a media file 122 and import the selected media file into mood cube 300, as shown in FIG. 6A. In other embodiments, any other suitable input operation of selecting and indicating the media file 122 via UI 301 can be employed.

In step 503, mood cube application 123 transmits the media file 122 selected in step 502 to server system 140. In step 504, mood cube application 123 generates a 3D display element for the selected media file 122, such as a cuboid. As described above, displayed on a front surface of the cuboid can be an image, text, or other visual information that is associated with the media file 122.

Figure 6B:
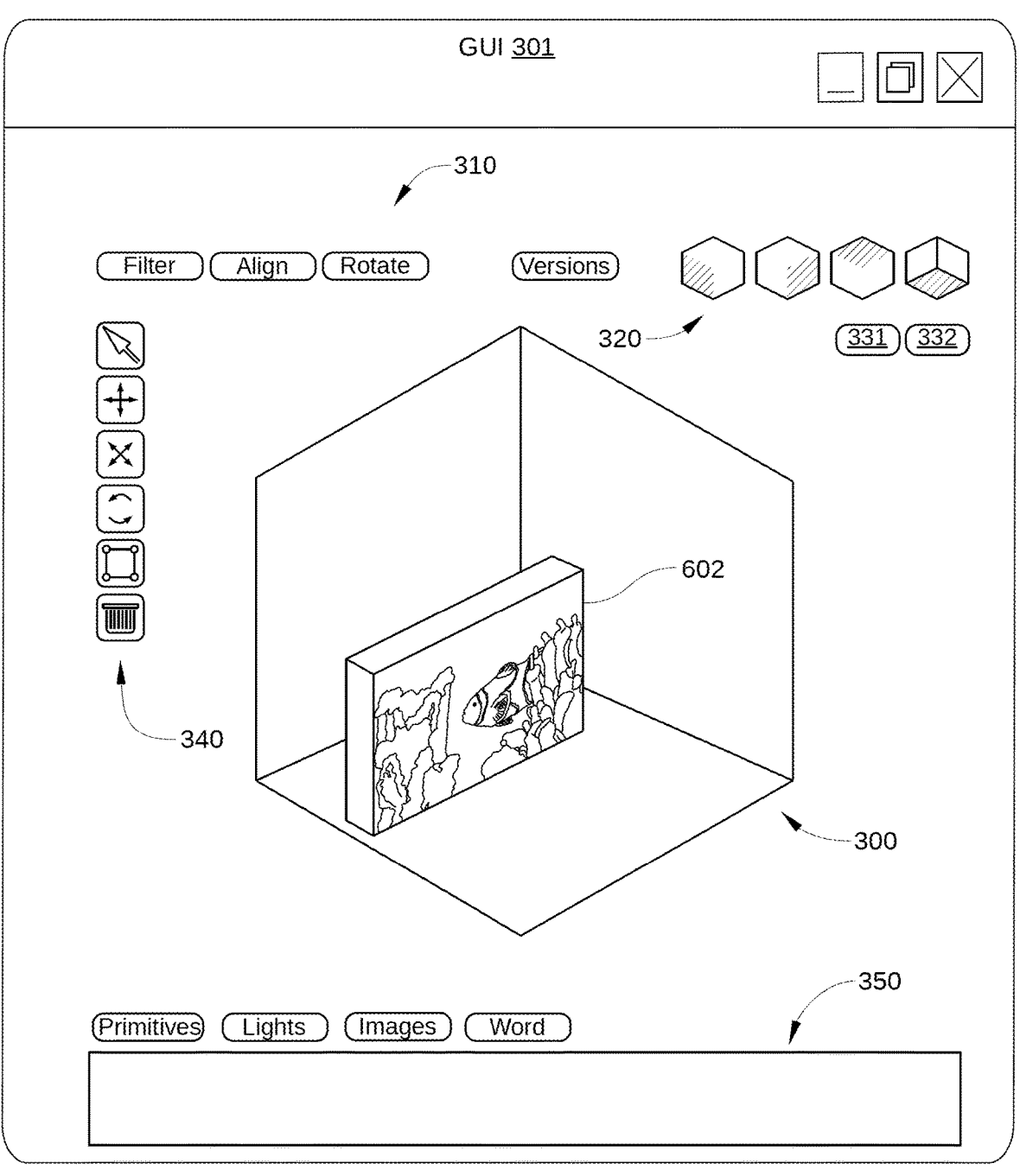

In step 505, mood cube application 123 positions the 3D display element (e.g., cuboid 602) within mood cube 300, as shown in FIG. 6B. In some embodiments, mood cube application 123 positions and/or orients the 3D display element based on the input operation. Alternatively, in some embodiments, mood cube application 123 positions the 3D display element at a default location within mood cube 300. In either case, the 3D display element can be subsequently repositioned and/or reoriented by a user via one or more UI inputs, such as an operation initiated via an input from tool bar 340 and/or scene-wide manipulation inputs 310.

In step 511, server system 140 extracts, for example via asset extractor 144, one or more aesthetic assets from the media file 122 transmitted by mood cube application 123. As noted above, different aesthetic assets can be extracted from different types of media files.

In step 512, server system 140 determines one or more suggested aesthetic assets based on the aesthetic assets extracted in step 511. For example, a key word or phrase extracted from media file 122 in step 511 can lead to various suggested image files, audio files, video files, and/or 3D-model files. Additionally or alternatively, the key word or phrase extracted from media file 122 in step 511 can lead to various suggested properties, such as colors, visual textures, sounds, and the like.

In step 513, server system 140 stores the aesthetic assets extracted in step 511 and the suggested aesthetic assets determined in step 512. In step 514, server system 140 transmits suggested aesthetic assets to mood cube application 123 of client device 120. In some embodiments, server system 140 also transmits the aesthetic assets extracted in step 511 to mood cube application 123 of client device 120. In such embodiments, the extracted aesthetic assets can also be employed as suggested aesthetic assets.

Figure 6C:
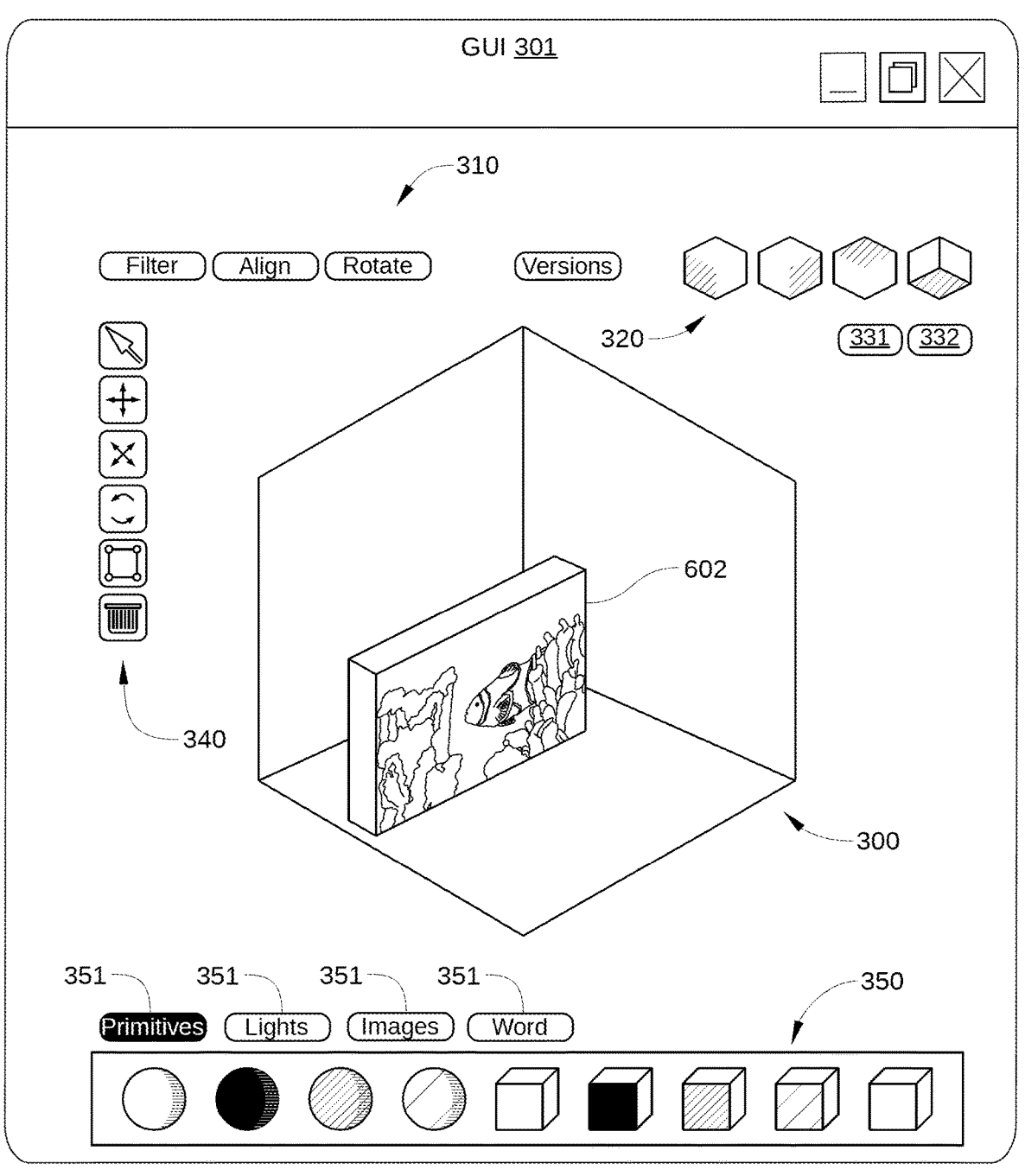

In step 521, which is performed in response to receiving suggested aesthetic assets determined in step 512 and/or the aesthetic assets extracted in step 511, mood cube application 123 populates suggestion panel 350 with suggestions, as shown in FIG. 6C. In some embodiments, mood cube application 123 automatically displays at least one category of suggested aesthetic assets in suggestion panel 350. Alternatively or additionally, in some embodiments, mood cube application 123 displays suggested aesthetic assets in response to a user input operation, such as selection of a specific category 351 of suggested aesthetic assets.

Figure 6D:
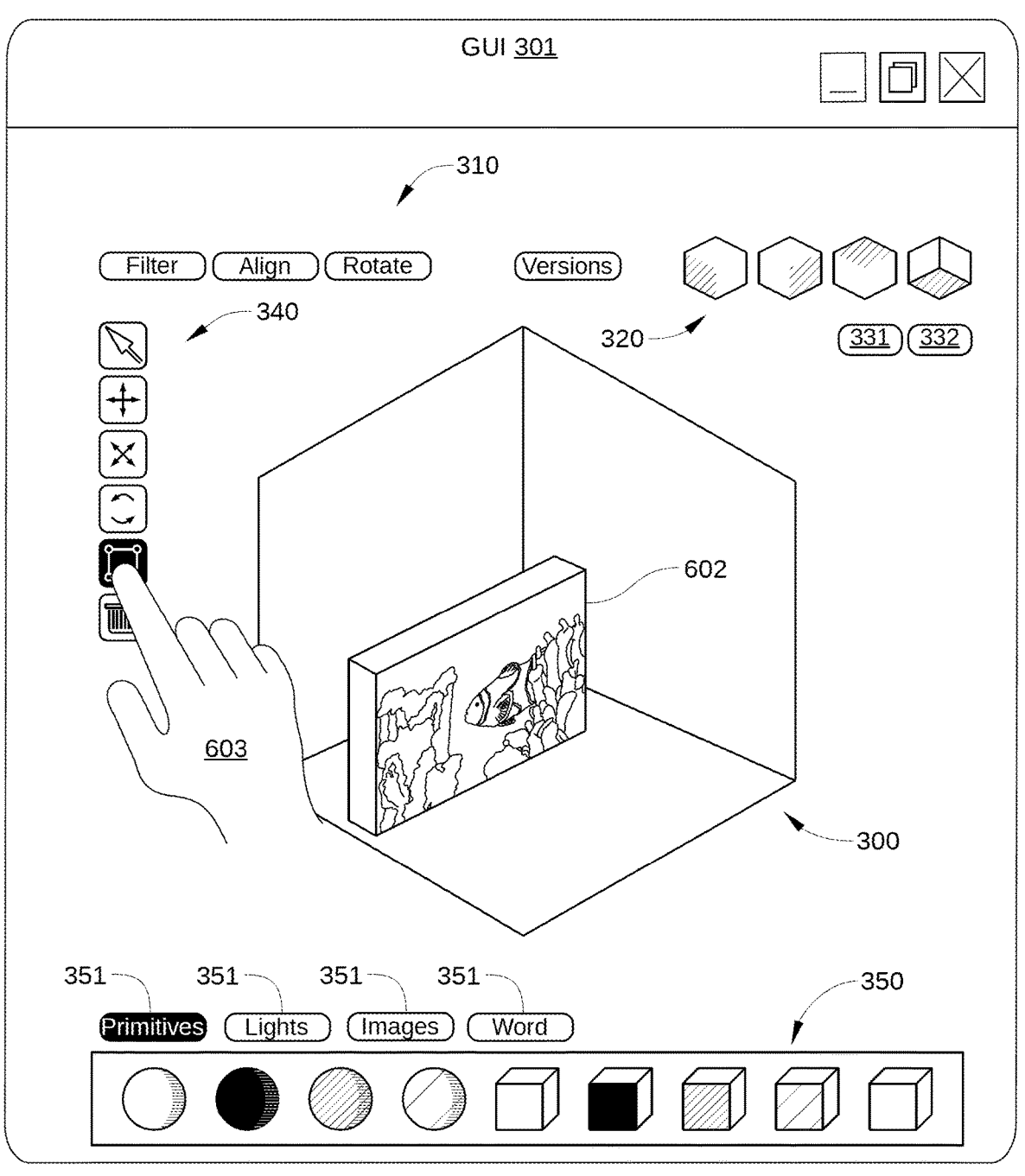

In step 522, mood cube application 123 receives one or more user inputs associated with a specific aesthetic asset currently disposed within mood cube 300, as shown in FIG. 6D. For example, in some embodiments, a user performs a selection operation on a specific aesthetic asset in conjunction with a selection 603 of a tool included in toolbar 340 or an input field in scene-wide manipulation inputs 310. Thus, in such an embodiment, the user indicates that the operation associated with the selected tool or input field is to be performed on the specific aesthetic asset.

In step 523, in response to the one or more user inputs received in step 522, mood cube application 123 modifies the display of the specific asset based on the selected tool in toolbar 340. For example, mood cube application 123 positions, scales, rotates, orients, deletes, duplicates, or otherwise modifies display of the cuboid associated with the specific aesthetic asset.

Exemplary Computing Device

Figure 7:
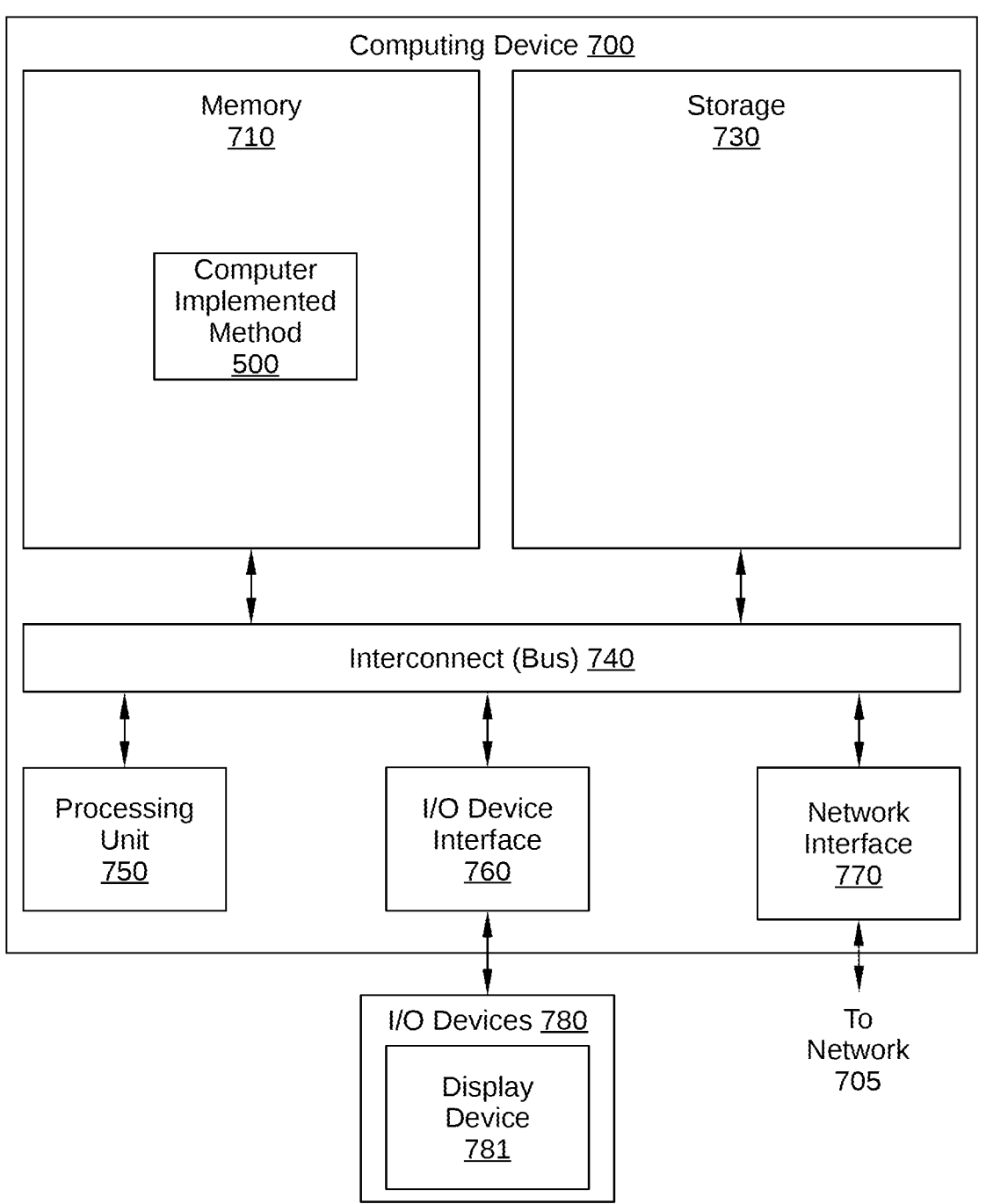
FIG. 7 is a block diagram of a computing device configured to implement one or more aspects of the various embodiments.

FIG. 7 is a block diagram of a computing device 700 configured to implement one or more aspects of the various embodiments. Thus, computing device 700 can be a computing device associated with computing system 100, such as client device 120 and/or server system 140. Computing device 700 may be a desktop computer, a laptop computer, a tablet computer, or any other type of computing device configured to receive input, process data, generate control signals, and display images. Computing device 700 is configured to perform operations associated with computer-implemented method 500 and/or other suitable software applications, which can reside in a memory 710. It is noted that the computing device described herein is illustrative and that any other technically feasible configurations fall within the scope of the present disclosure.

As shown, computing device 700 includes, without limitation, an interconnect (bus) 740 that connects a processing unit 750, an input/output (I/O) device interface 760 coupled to input/output (I/O) devices 780, memory 710, a storage 730, and a network interface 770. Processing unit 750 may be any suitable processor implemented as a central processing unit (CPU), a graphics processing unit (GPU), an application-specific integrated circuit (ASIC), a field programmable gate array (FPGA), any other type of processing unit, or a combination of different processing units, such as a CPU configured to operate in conjunction with a GPU. In general, processing unit 750 may be any technically feasible hardware unit capable of processing data and/or executing software applications, including processes associated with computer-implemented method 500. Further, in the context of this disclosure, the computing elements shown in computing device 700 may correspond to a physical computing system (e.g., a system in a data center) or may be a virtual computing instance executing within a computing cloud.

I/O devices 780 may include devices capable of providing input, such as a keyboard, a mouse, a touch-sensitive screen, and so forth, as well as devices capable of providing output, such as a display device 781. Additionally, I/O devices 780 may include devices capable of both receiving input and providing output, such as a touchscreen, a universal serial bus (USB) port, and so forth. I/O devices 780 may be configured to receive various types of input from an end-user of computing device 700, and to also provide various types of output to the end-user of computing device 700, such as one or more graphical user interfaces (GUI), displayed digital images, and/or digital videos. In some embodiments, one or more of I/O devices 780 are configured to couple computing device 700 to a network 705.

Memory 710 may include a random access memory (RAM) module, a flash memory unit, or any other type of memory unit or combination thereof. Processing unit 750, I/O device interface 760, and network interface 770 are configured to read data from and write data to memory 710. Memory 710 includes various software programs that can be executed by processor 750 and application data associated with said software programs, including computer-implemented method 500.

In sum, the various embodiments described herein provide techniques for collecting and interacting with digital inspirational materials. In the embodiments, a computing system automatically generates a virtual 3D representation of a media file and incorporates the virtual 3D representation in a virtual 3D-modeling environment. The media file can be any of various file types, including an image file, an audio file, a video file, and a 3D-modeling file. The computing system also automatically generates creative suggestions within the virtual 3D-modeling environment.

At least one technical advantage of the disclosed techniques relative to the prior art is that the disclosed techniques enable the generation of a virtual design workspace that can incorporate collected materials having audio, video, and/or three-dimensional components. Thus, different media types besides two-dimensional images can be employed in the virtual design workspace by a user to create a cohesive aesthetic. A further advantage of the disclosed techniques is that collected materials can be automatically decomposed into individual aesthetic assets (e.g., colors, visual textures, sounds, shapes, and key words) when imported into the virtual design workspace. As a result, the generation of creative simulations and prototypes based on these decomposed aesthetic assets is facilitated, as well as user inspiration through remixing and juxtapositioning of such aesthetic assets. These technical advantages provide one or more technological advancements over prior art approaches.

1. In some embodiments, a computer-implemented method for generating a virtual collection of digital materials includes: generating a virtual three-dimensional (3D) design workspace; and, in response to a first operation that is associated with a first media file: automatically generating a virtual 3D representation of the first media file; and automatically incorporating the virtual 3D representation of the first media file into the virtual 3D design workspace.

2. The computer-implemented method of clause 1, further comprising causing a rendering of the virtual 3D design workspace to be displayed, wherein the virtual 3D representation is incorporated into the virtual 3D design workspace.

3. The computer-implemented method of clauses 1 or 2, further comprising rendering the virtual 3D design workspace as either a two-dimensional construct or a 3D construct, wherein the 3D representation is incorporated into the virtual 3D design workspace.

4. The computer-implemented method of any of clauses 1-3, wherein the first operation comprises a drag-and-drop operation.

5. The computer-implemented method of any of clauses 1-4, wherein the first operation is performed via a user interface that displays a rendering of the virtual 3D design workspace.

6. The computer-implemented method of any of clauses 1-5, further comprising modifying a position of the virtual 3D representation of the first media file within the virtual 3D design workspace in response to a second operation.

7. The computer-implemented method of any of clauses 1-6, wherein the second operation comprises at least one of a translation operation, a rotation operation, a deletion operation, a facing setting operation, or a scaling operation.

8. The computer-implemented method of any of clauses 1-7, further comprising: extracting a property from the first media file; generating a virtual 3D representation of the property; and incorporating the virtual 3D representation of the property into the virtual 3D design workspace.

9. The computer-implemented method of any of clauses 1-8, wherein incorporating the virtual 3D representation of the property into the virtual 3D design workspace comprises causing the virtual 3D representation of the property to be displayed as a suggested design asset within the virtual 3D design workspace.

10. The computer-implemented method of any of clauses 1-9, wherein causing the virtual 3D representation of the property to be displayed as the suggested design asset comprises at least one of: causing a first geometric primitive to be displayed showing a color that is included in an image associated with the first media file, causing a second geometric primitive to be displayed showing a visual texture that is included in the image associated with the first media file, causing a third geometric primitive to be displayed showing a keyword that is associated with the first media file, causing a fourth geometric primitive to be displayed showing an image that is associated with the first media file, causing a fifth geometric primitive to be displayed showing a plurality of video frames that is associated with the first media file, or causing a sixth geometric primitive to be displayed that enables audio data that is associated with the first media file to be played.

11. The computer-implemented method of any of clauses 1-10, wherein extracting the property of the first media file comprises at least one of selecting a color included in an image associated with the first media file, selecting a visual texture included in the image associated with the first media file, selecting text associated with the first media file, selecting a set of video frames included in a video associated with the first media file, and selecting a portion of audio included in the first media file.

12. In some embodiments, a non-transitory computer readable medium includes a set of instructions which, in response to execution by a processor of a computer system, cause the processor to perform the steps of: generating a virtual three-dimensional (3D) design workspace; and, in response to a first operation that is associated with a first media file: automatically generating a virtual 3D representation of the first media file; and automatically incorporating the virtual 3D representation of the first media file into the virtual 3D design workspace.

13. The non-transitory computer readable medium of clause 12, further comprising, in response to a second operation associated with a second media file: automatically generating a virtual 3D representation of the second media file; and automatically incorporating the virtual 3D representation of the second media file into the virtual 3D design workspace, wherein the first media file is associated with a first media type and the second media file is associated with a second media type that is different than the first media type.

14. The non-transitory computer readable medium of clauses 12 or 13, further comprising: determining a suggested aesthetic asset based on a property extracted from the first media file; generating a virtual 3D representation of the suggested aesthetic asset; and incorporating the suggested aesthetic asset into the virtual 3D design workspace.

15. The non-transitory computer readable medium of any of clauses 12-14, wherein determining the suggested aesthetic asset comprises at least one of searching for an instance of a two-dimensional image or 3D model that includes a color included in an image associated with the first media file, searching for an instance of a two-dimensional image or 3D model that includes a visual texture included in the image associated with the first media file, searching for an instance of an audio file that is associated with a key word included in the first media file, searching for an instance of a two-dimensional image or 3D model that is associated with the key word included in the first media file, and searching for an instance of a video file that is associated with a key word included in the first media file.

16. The non-transitory computer readable medium of any of clauses 12-15, wherein determining the suggested aesthetic asset based on the property extracted from the first media file comprises: generating at least one two-dimensional view of a 3D model included in the first media file; generating a key word or phrase based on an image analysis of the at least one two-dimensional view; and performing an Internet or database search for an instance of a media file based on the key word or phrase.

17. The non-transitory computer readable medium of any of clauses 12-16, further comprising causing a displayed appearance associated with one or more virtual 3D representations included in the virtual 3D design workspace to be modified in response to a user selection of a filtering tool included in a graphical user interface that displays a rendering of the virtual 3D design workspace.

18. The non-transitory computer readable medium of any of clauses 12-17, further comprising displaying the virtual 3D design workspace and at least one additional version of the virtual 3D design workspace in response to a user selection of a version management field included in a graphical user interface that displays a rendering of the virtual 3D design workspace.

19. The non-transitory computer readable medium of any of clauses 12-18, wherein the first media file comprises an image, a video, a 3D model, or an audio file.

20. In some embodiments, a system, comprises: a memory that stores instructions; and a processor that is communicatively coupled to the memory. The processor is configured to, when executing the instructions, perform the steps of: generating a virtual three-dimensional (3D) design workspace; and in response to a first operation that is associated with a first media file: automatically generating a virtual 3D representation of the first media file; and automatically incorporating the virtual 3D representation of the first media file into the virtual 3D design workspace.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating a virtual collection of digital materials, the method comprising:

generating a virtual three-dimensional (3D) design workspace; and in response to a first operation that is associated with a first media file:

automatically generating a first virtual 3D representation of the first media file, wherein the first media file comprises a two-dimensional image file that includes one or more properties;

automatically incorporating the first virtual 3D representation of the first media file into the virtual 3D design workspace at a first location;

receiving a suggested aesthetic asset that is based on the one or more properties included in the first media file, wherein the suggested aesthetic asset comprises an audio file or video file; and incorporating the suggested aesthetic asset into the virtual 3D design workspace at a second location, wherein the suggested aesthetic asset is represented as a second virtual 3D representation that, when selected at the second location, causes the audio file or video file to be played back.

2. The computer-implemented method of claim 1, further comprising causing a rendering of the virtual 3D design workspace to be displayed at the first location, wherein the first virtual 3D representation is incorporated into the virtual 3D design workspace.

3. The computer-implemented method of claim 2, further comprising rendering the virtual 3D design workspace as a 3D construct, wherein the first virtual 3D representation is incorporated into the virtual 3D design workspace.

4. The computer-implemented method of claim 1, wherein the first operation comprises a drag-and-drop operation.

5. The computer-implemented method of claim 4, wherein the first operation is performed via a user interface that displays a rendering of the virtual 3D design workspace.

6. The computer-implemented method of claim 1, further comprising modifying a position of the first virtual 3D representation of the first media file from the first location within the virtual 3D design workspace in response to a second operation.

7. The computer-implemented method of claim 6, wherein the second operation comprises at least one of a translation operation, a rotation operation, a deletion operation, a facing setting operation, or a scaling operation.

8. The computer-implemented method of claim 1, further comprising:

extracting the one or more properties from the first media file;

generating a third virtual 3D representation that represents the one or more properties; and incorporating the third virtual 3D representation into the virtual 3D design workspace.

9. The computer-implemented method of claim 8, wherein extracting the one or more properties of the first media file comprises at least one of:

selecting a color included in the two-dimensional image file, selecting a visual texture included in the two-dimensional image file, or selecting text associated with the first media file.

10. The computer-implemented method of claim 1, wherein incorporating the suggested aesthetic asset comprises at least one of:

causing a first geometric primitive to be displayed showing a plurality of video frames that is associated with the suggested aesthetic asset, or causing a second geometric primitive to be displayed that enables audio data that is associated with the suggested aesthetic asset to be played.

11. A non-transitory computer readable medium that includes a set of instructions which, in response to execution by a processor of a computer system, cause the processor to perform the steps of:

generating a virtual three-dimensional (3D) design workspace; and in response to a first operation that is associated with a first media file:

automatically generating a first virtual 3D representation of the first media file, wherein the first media file comprises a two-dimensional image file that includes one or more properties;

automatically incorporating the first virtual 3D representation of the first media file into the virtual 3D design workspace at a first location;

receiving a suggested aesthetic asset that is based on the one or more properties included in the first media file, wherein the suggested aesthetic asset comprises an audio file or video file; and incorporating the suggested aesthetic asset into the virtual 3D design workspace at a second location, wherein the suggested aesthetic asset is represented as a second virtual 3D representation that, when selected at the second location, causes the audio file or video file to be played back.

12. The non-transitory computer readable medium of claim 11, further comprising, in response to a second operation associated with a second media file:

automatically generating a third virtual 3D representation that represents the second media file; and automatically incorporating the third virtual 3D representation into the virtual 3D design workspace, wherein the second media file is associated with a second media type that is different than the two-dimensional image file.

13. The non-transitory computer readable medium of claim 11, further comprising generating the second virtual 3D representation, wherein incorporating the suggested aesthetic asset comprises rendering the second virtual 3D representation as a cube or a cuboid in the virtual 3D design workspace at the second location.

14. The non-transitory computer readable medium of claim 11, wherein the suggested aesthetic asset is determined by at least one of:

searching for an instance of a two-dimensional image or 3D model that includes a color included in the two-dimensional image file, searching for an instance of a two-dimensional image or 3D model that includes a visual texture included in the two-dimensional image file, searching for an instance of an audio file that is associated with a key word included in metadata for the first media file, searching for an instance of a two-dimensional image or 3D model that is associated with the key word included in the metadata for the first media file, or searching for an instance of a video file that is associated with a key word included in the metadata for the first media file.

15. The non-transitory computer readable medium of claim 11, further comprising:

generating a key word or phrase based on an image analysis of the two-dimensional image file; and performing an Internet or database search for an instance of a media file based on the key word or phrase, wherein the suggested aesthetic asset corresponds to the media file.

16. The non-transitory computer readable medium of claim 11, further comprising causing a displayed appearance associated with one or more virtual 3D representations included in the virtual 3D design workspace to be modified in response to a user selection of a filtering tool included in a graphical user interface that displays a rendering of the virtual 3D design workspace.

17. The non-transitory computer readable medium of claim 11, further comprising displaying the virtual 3D design workspace and at least one additional version of the virtual 3D design workspace in response to a user selection of a version management field included in a graphical user interface that displays a rendering of the virtual 3D design workspace.

18. A system, comprising:

a memory that stores instructions; and a processor that is communicatively coupled to the memory and is configured to, when executing the instructions, perform the steps of:

generating a virtual three-dimensional (3D) design workspace; and in response to a first operation that is associated with a first media file:

automatically generating a first virtual 3D representation of the first media file, wherein the first media file comprises a two-dimensional image file that includes one or more properties;

automatically incorporating the first virtual 3D representation of the first media file into the virtual 3D design workspace at a first location;

receiving a suggested aesthetic asset that is based on the one or more properties included in the first media file, wherein the suggested aesthetic asset comprises an audio file or video file; and incorporating the suggested aesthetic asset into the virtual 3D design workspace at a second location, wherein the suggested aesthetic asset is represented as a second virtual 3D representation that, when selected at the second location, causes the audio file or video file to be played back.

* * * * *